Nov. 13, 1951  H. M. RODEKOHR ET AL  2,574,759
CONTINUOUS PROCESS FOR MAKING ALKYLLEAD COMPOUNDS
Filed Jan. 3, 1949  2 SHEETS—SHEET 1
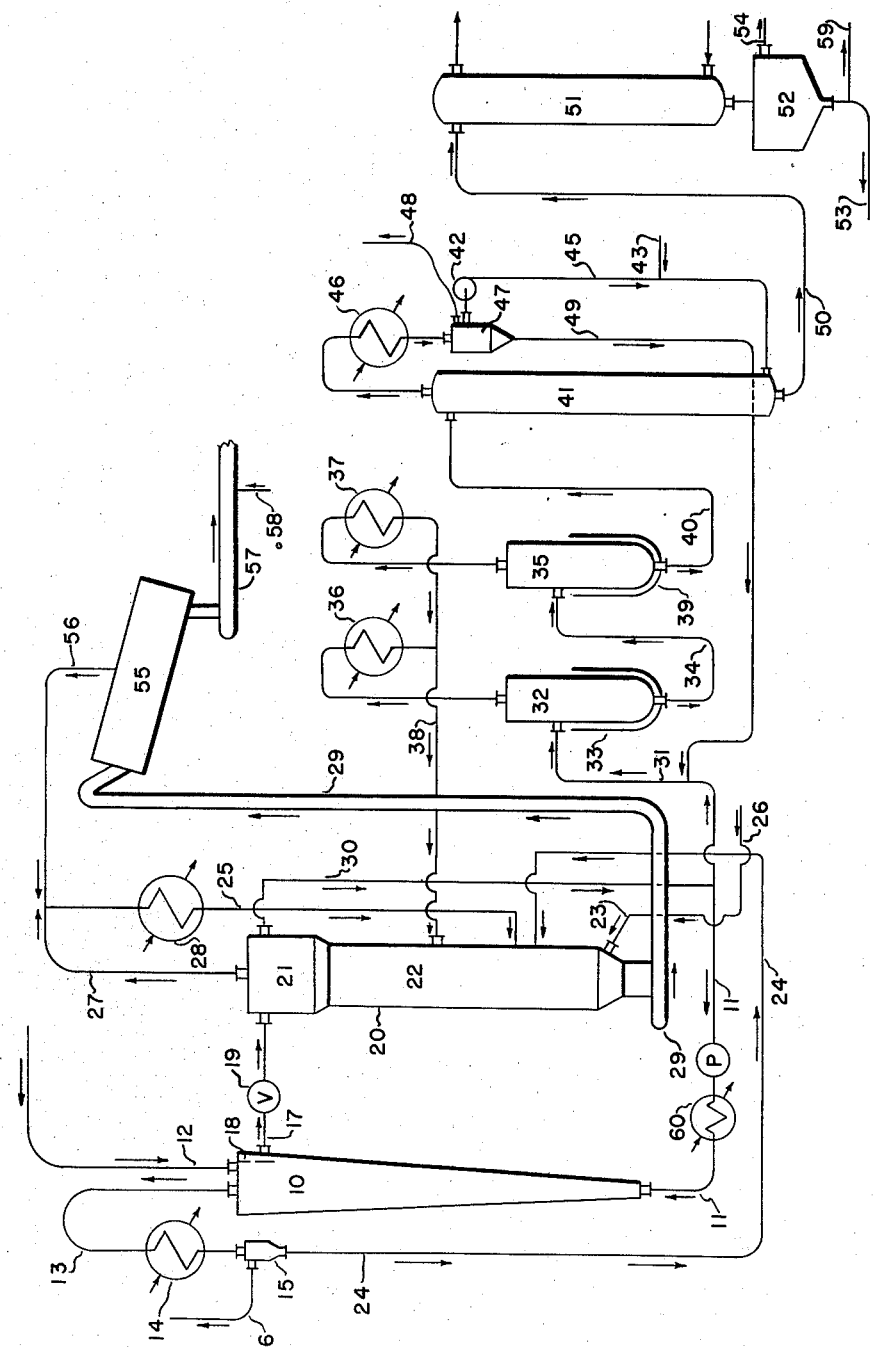
FIGURE I
*INVENTORS*
HOWARD M. RODEKOHR
SIDNEY M. BLITZER
BY *Kenneth Swartwood*

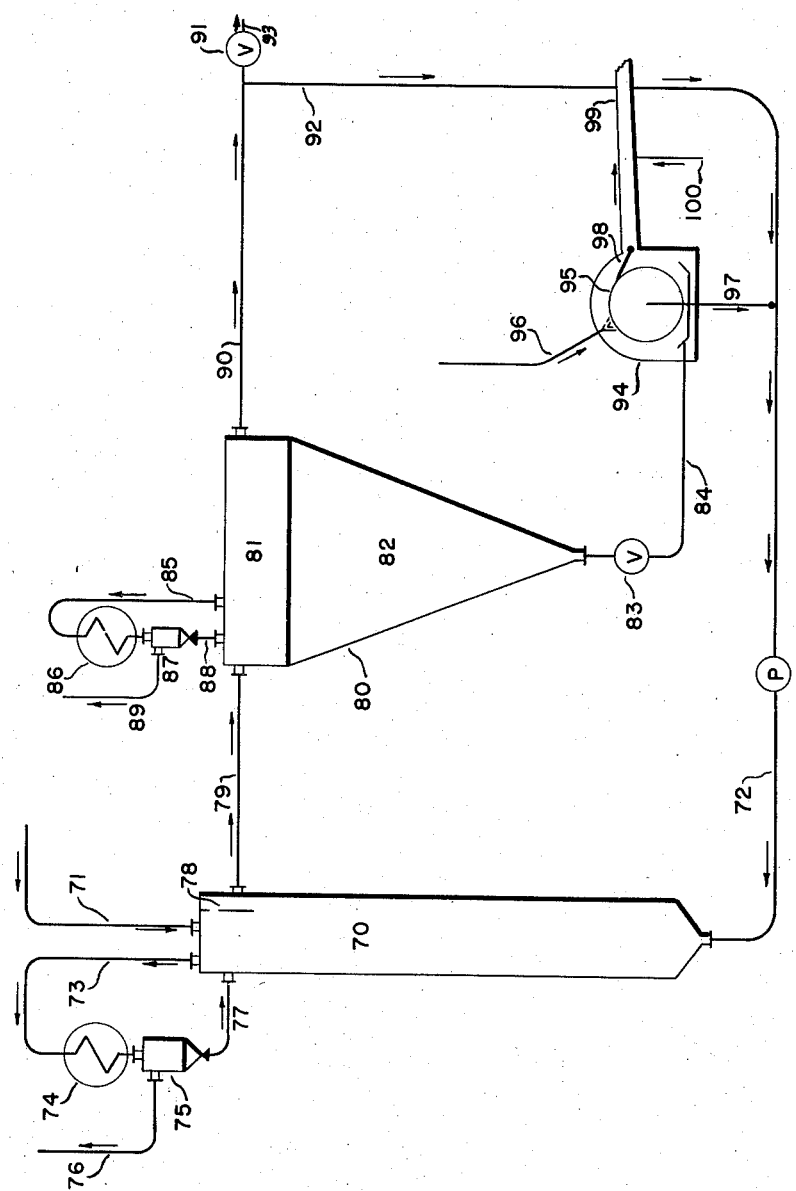
FIGURE II
INVENTORS
HOWARD M. RODEKOHR
SIDNEY M. BLITZER
BY Kenneth Swartwood

Patented Nov. 13, 1951

2,574,759

UNITED STATES PATENT OFFICE 2,574,759

CONTINUOUS PROCESS FOR MAKING ALKYLLEAD COMPOUNDS

Howard M. Rodekohr and Sidney M. Blitzer, Baton Rouge, La., assignors to Ethyl Corporation, New York, N. Y., a corporation of Delaware Application January 3, 1949, Serial No. 68,934

11 Claims. (Cl. 260—437)

This invention relates to a new method of manufacture of lead alkyls. More specifically, the invention is concerned with an improved process for reacting an alkylating agent with an active form of lead and isolating the lead alkyl compound thereby formed. The invention relates particularly to a continuous process for the manufacture of tetraethyllead.

According to past industrial practice, tetraethyllead has been made by the batchwise reaction of an ethylating agent and an alloy of lead. Ethyl chloride and a mono-sodium alloy of lead are employed. The ethyl chloride and sodium-lead alloy are reacted in an autoclave or reaction vessel which is fitted with a stirrer or agitator. The sodium-lead alloy is added to the reactor as a comminuted or ground solid alloy, to provide adequate surface area for its reaction with the liquid ethyl chloride.

The reaction is carried out at an elevated temperature and pressure, to obtain a satisfactory rate of formation of tetraethyllead. On completion of the reaction, the reacted charge is removed from the autoclave for recovery of the tetraethyllead.

The mixture of products of reaction appears to be dry, powdered solids, hereafter referred as as "reaction mass," The mixture contains the tetraethyllead produced by the reaction, sodium chloride, excess lead metal, and small amounts of excess sodium and traces of ethyl chloride. Tetraethyllead has been recovered in the past by immersing this reaction mass in water and passing steam therethrough while agitating. The tetraethyllead is removed by this distillation, the residue of solids being then processed for recovery of metallic lead content.

The above general process for formation and recovery, while it has been in successful use for an extended period, has numerous shortcomings which have long been recognized but never successfully eliminated. Most important is the fact that the process outlined is a batch operation and is not adaptable to a continuous flow process. In general, in the process industries, it is well recognized that batch operations are inherently more inefficient than continuous flow operations. Batch methods are justified for small-scale production or intermittent operation. In large scale operations, however, a batch process usually compares unfavorably with a continuous operation. Continuous methods effect savings in operating labor, increase the capacity of a plant, and result in a more uniform product. Also in a continuous process there is less of the hazardous material undergoing processing. Higher yields are obtainable in our continuous process due to better control of the reaction conditions.

In addition to the general objection of being a batch operation, the above-outlined process has numerous specific shortcomings. In the reaction step, for example, the reactor is necessarily fitted with an agitating device. This necessitates seals and packings to prevent leakage at the point where the drive shaft for the agitator enters the reactor. These require careful and frequent maintenance. Another objectionable mechanical feature is the need for a complicated valve to allow discharge of the reaction products. Since the reaction mass is apparently a mixture of solids, provision must be made to discharge powdered solids. This requires valves of very complicated design and expensive construction.

The past method of recovery of tetraethyllead by steam distillation from the reaction mass also has objectionable features. As the reaction mass is totally immersed and agitated in water, any unreacted sodium thus contacted is converted to sodium hydroxide by reaction with the water. The substantial quantities of soduim chloride produced by the reaction are also dissolved. This solution is discarded. Recovery of these sodium compounds is, of course, technically possible, but the cost of recovery from aqueous solution is considerably greater than the actual value of the compounds. In addition, any sodium hydroxide recovered would be worth much less than the equivalent sodium metal. The sodium in the dissolved sodium chloride and sodium hydroxide left in the still solution therefore is an outright loss.

Inasmuch as excess sodium in the reaction mass is a loss chargeable to the process, the reaction step is carried out under conditions which result in the highest possible yield of tetraethyllead from the reaction. As apparent to those skilled in the art, this is an inefficient procedure. The formation of tetraethyllead proceeds at a rapid rate for the first portion of the reaction. As the sodium in the alloy is used up, the rate of formation decreases. Therefore, it requires about as long to obtain a one per cent additional yield, at the end of a batch reaction, as it does to obtain twenty per cent in the first part of a cycle. The economic significance of this is that, in order to use as much as possible of the sodium initially fed in alloy, the reaction itself is carried out inefficiently with respect to throughput rate since the reaction period is greatly extended to obtain increased, or high yields.

In summary, the former procedure exhibits pronounced disadvantages. These include (a) the inherent inefficiency of batch operations (b) the necessity of employing complicated mechanical agitators and valves which are expensive and difficult to maintain and (c) the recovery of tetraethyllead by steam distillation which results in outright loss of unreacted sodium metal and necessitates carrying out the reaction inefficiently.

The objects of our invention are to solve these serious deficiencies of the prior art. A primary object is to provide a continuous process. A further object is to provide a unique method whereby the continuous process can be carried out in relatively simple, trouble-free equipment. An additional and important object is to substantially increase the recovery of valuable materials and increase the overall yield of the process. Other objects will appear hereafter.

We attain these objects by a unique reaction technique not heretofore known or used. The reaction technique is combined with a new method of recovery which is essential to attainment of the desired objects.

Our reaction technique comprises, broadly speaking, the contacting of an active form of lead with an ascending liquid stream containing an effective amount of an alkylating agent. By active form of lead, we refer to various lead or lead-containing materials which are active for the purpose of the process of our invention by virtue of the type of chemical combination in which they occur, or of the physical state of aggregation and nature of the surface of the particles, or because of a combination of these properties. Thus, lead metal which has been alloyed with, for example, an alkali metal, and the resulting alloy comminuted to appropriate particle size and distribution, is reactive in the presence of appropriate alkylating agents and is considered to be a form of active lead. Lead in chemical combination, such as in the form of lead chloride, is likewise active lead, for the purpose of the process of our invention, in the presence of alkylating agents of appropriate type. A still further example of active lead is one in which the material comprises essentially lead metal, and wherein the activity may be ascribed to the state of subdivision and the nature of the surface of the particles. As examples of such forms of active lead can be cited lead powders, formed by grinding, chipping and other means apparent to those skilled in the art, and which are prepared in such manner as to provide the particles with non-oxidized, chemically clean surfaces. A still further example of active lead comprising essentially metallic lead, is the lead metal resulting from the reaction of various lead-bearing materials with alkylating agents in the manufacture of tetraethyllead by methods known to those skilled in the art, such as, for example, the lead metal produced in the present commercial process for the manufacture of tetraethyllead from the reaction between sodium-lead alloy and ethyl chloride in a batch operation.

Various alkylating agents can be utilized in practicing the process of our invention. Alkyl halides, chosen from among the chlorides, bromides and iodides can be successfully used as well as the alkyl sulfates. In the manufacture of tetraethyllead, ethyl chloride is the preferred alkylating agent although other alkylating agents are also advantageous and sometimes more economical, and these include the ethyl derivatives of the alkylating agents enumerated above.

Our new reaction technique utilizes the discovery of an unusual transformation in the form and of the properties of active lead and any residue solids during the formation of lead alkyl compounds. For example, in the manufacture of tetraethyllead from sodium-lead alloy and ethyl chloride the alloy solids crumble or disintegrate shortly after contacting the ethyl chloride at reaction conditions, in addition to reacting at the surface of the particles. Such newly formed particles react with vigor and frequently tend to subdivide further at a slower rate. In addition, the reaction of the particles is accompanied by a decrease in density due to the removal therefrom of reacted sodium and to the formation of by-product sodium chloride in situ. Surprisingly, the sodium chloride so formed remains intimately intermingled with excess lead in the particles. Frequently, the particles tend toward a fairly uniform size distribution even though they are still undergoing reaction and a consequent decrease in density.

The above discovery of both disintegration and change in density of solids during the formation of alkyllead compounds is of great advantage in our reaction technique. We employ an ascending stream of alkylating agent to react with the active lead solids. The alkylating agent suspends the reacting solids therein and maintains them in discrete form without benefit of complicated mechanical stirrers. Further, the reacted solids are segregated from reacting solids and finely transported from the reaction zone by the liquid itself. This reaction technique, which we term "suspensive contacting" thus simultaneously accomplishes the threefold functions of contacting at reaction conditions, classification and removal from the reactor.

We have found that the suspensive contacting can be carried out in a variety of reactors. A general requirement of the technique is that the ascending liquid does not increase in velocity in its upward flow. As will appear hereafter, the method can be altered or modified to perform most efficiently for a specific requirement.

The reaction of the active lead and alkylating agent produces a lead alkyl compound and a solid residue. We have found that the lead alkyl compounds can be separated from the solids by a new method which does not destroy the valuable materials present as in former practice. Our recovery method comprises the leaching or extraction of the lead alkyl compound from the solids with a solvent. Various liquids are suitable for this purpose, a preferred solvent being the liquid alkylating agent.

The invention can be more fully understood by reference to the figures. Figure I is a diagrammatic illustration of a preferred embodiment. Figure II is a modification of Figure I illustrating another embodiment of our invention. These embodiments are described for the manufacture of tetraethyl-lead. It will be understood that other alkyl-lead compounds can be manufactured by very similar embodiments. Sodium-lead alloy is the preferred active form of lead and ethyl chloride is the preferred ethylating agent.

Referring to Figure I, sodium-lead alloy and ethyl chloride are reacted in reactor 10. This vessel is of elongated conical shape, divergent upwardly. A liquid stream containing ethyl chloride is introduced at the bottom of the reactor, through line 11. The liquid is suspensively contacted with sodium-lead alloy therein. The alloy is fed at the top of the reactor, through line 12. Feeding as a molten liquid is the preferred mode of introduction, but addition as comminuted solids is a satisfactory procedure. A liquid or molten alloy is easily fed to a zone of higher pressure, as, for example, to a reactor. In introducing molten alloy, it is preferable to feed as a very coarse "spray," for example dispersion into a spray of about ⅛-inch to ¼-inch drops is preferred. The drops solidify quickly after contacting the liquid phase.

The reaction conditions can be varied over a wide range, 40° C. to 150° C. However, the preferred temperature range is from 70° C. to 120° C., dependent on the rapidity of reaction necessary. An elevated pressure is required because of the volatility of ethyl chloride, the preferred pressure range being from 70 to 250 pounds per square inch, gauge.

The alloy solids, on reacting with ethyl chloride, first crumble and then exhibit a decrease in density as well as some further reduction in particle size, as previously described.

The solids, on being fed to the reactor, drop through the liquid, eventually reaching a stable or suspended condition. The conical shape of the reactor 10 provides a liquid velocity gradient decreasing upwardly. With this velocity distribution, the solids in the reactor rise as they decrease in density and size. Agitation apparatus within this reactor is entirely avoided. Further, a classification of solids within the reactor is accomplished, so that only material sufficiently reacted is removed from reaction conditions.

The velocities in the reactor can be varied through a substantial range and good results will be obtained. The basic velocity requirement of our invention is that the liquid alkylating agent should be introduced at a rate sufficient to maintain suspensive contacting of the active form of lead. As long as such suspensive contacting is maintained, the velocity can be varied within relatively wide limits. The velocity range required for suspensive contacting depends on the type and condition of the active form of lead, the nature of the liquid alkylating agent, the conditions at which reaction is carried out, and the degree of reaction desired. To some extent the range is dependent also on the design of the reactor. The velocity at the top of the reactor, which is designated as "terminal velocity" is preferably at least 0.03 feet per second. If desired, higher velocities can be employed, as, for example if greater production is required. The usual preferred range of terminal velocity is from 0.03 to 0.15 feet per second, although even higher velocities can be utilized. Thus the yield and production rate of tetraethyllead can be varied to provide the optimum conditions existing at the time.

The liquid velocity at the bottom or inlet of the reactor, termed "initial velocity," in most operations should preferably be maintained above 0.10 feet per second. A preferred range is 0.10 to 1.5 feet per second although even higher velocities in some cases may be desirable. The term "initial velocity" as used herein refers to actual velocity, rather than to a superficial velocity as frequently used in chemical engineering practice.

The reactor proportions can vary considerably within the teachings of our invention. In general, the proportions should be such that the throughput time for the liquids will be at least 0.1 hour. A preferred range is from 0.1 hour to 2 hours, although the longer period will seldom be required. It has been found that this range of liquid throughput or residence times, at reaction conditions, usually carries the reaction through to the stage where the solids exist in spheroidal or nearly spheroidal particles.

The formation of tetraethyllead releases substantial amounts of heat which must be removed. The present embodiment provides for such heat removal by vaporization and condensation of ethyl chloride. Vapor leaves the reactor in line 13 and is liquefied by condenser 14. A receiver chamber 15, separates small amounts of non-condensible by-product hydrocarbons formed in the reaction. These are vented through line 16.

The outlet stream from the reactor consists of tetraethyllead, excess ethyl chloride, and reacted solids. These solids consist of an intimate mixture which is predominantly unreacted lead, sodium chloride formed by the reaction and a small proportion of unreacted sodium. As heretofore described the upward liquid velocity in the reactor is adequate to transport these solids to the top. The reacted solids are thus swept out with the liquid components through line 17. A baffle 18 is built as an integral part of the reactor to separate the alloy feed point from the opening to the discharge line 17.

Passing through valve 19 the reactor effluent flows to a settler-extractor apparatus 20. This apparatus is composed of a settler 21 surmounting an extractor 22. The function of this unit is to achieve a separation of the reactor effluent into a solids-free liquid stream containing substantially all the tetraethyllead, and a predominantly solids stream containing substantially no tetraethyllead. In the extractor 22 a column of settled solids is washed by an ascending stream of pure ethyl chloride. The ethyl chloride is a ready solvent for tetraethyllead so that a stream of solids wet with ethyl chloride is obtained at the bottom of the extractor.

The ethyl chloride fed to the extracting zone 22 is obtained from several sources. Pure, fresh ethyl chloride is introduced through line 26 to inlet 23 at the bottom of the extractor. This insures complete removal of tetraethyllead from the solids before they are discharged from the extractor. In addition to the fresh ethyl chloride, several recovered ethyl chloride streams from other portions of the process are utilized. These include ethyl chloride from the reactor vapors, fed by line 24, and ethyl chloride recovered from the settler 21 and the drier 55, fed through line 25. These recovered ethyl chloride streams contain small but detectable amounts of tetraethyllead, and are introduced for this reason at points above the feed point for the pure, fresh ethyl chloride.

The settler-extractor is operated at a nominal pressure slightly above atmospheric pressure. In passing through valve 19 the reactor effluent undergoes a large pressure drop. This pressure decrease results in the vaporization of a considerable amount of ethyl chloride and smaller amounts of tetraethyllead. These vaporized materials disengage from the liquid and solid phases in settling section 21, and pass through line 27 to a suitable condenser 28.

The solids settle in extractor 22 to form a loosely packed column. A slowly rising stream of ethyl chloride dissolves the tetraethyllead from the solids as heretofore explained. Depending upon many factors discussed herein, a velocity below 0.03 feet per second, is satisfactory, a preferred range being 0.01 to 0.03 feet per second although velocities as high as 0.06 feet per second may sometimes be successfully employed. In practice it will be desirable to allow the solids to build up in the extracting section to form a relatively elongated column before withdrawal of any washed or extracted solids. This facilitates complete washing of the solids. It has been found that tetraethyllead is rapidly washed or dissolved by ethyl chloride. In fact, almost complete extraction is obtained by a contact time of two minutes or more. We favor a contact time of solids with liquids of from six minutes, or 0.1 hour, to 0.5 hour. Contact time here refers to the time of residence of the solids in the extractor 22.

Solids from the bottom of the extractor 22 are deposited in conveyor 29. They are thus moved to a drying apparatus 55. A conveying path is followed through sufficient elevation to more than compensate for the static pressure head in the settler-extractor 20. This vertical rise prevents carryover of ethyl chloride liquid; the upper portion of the conveyor thus acts as a draining section, allowing excess ethyl chloride to drain back toward the settler-extractor.

Conveyor 29 discharges the solids, still wet with ethyl chloride, to a drying apparatus 55. A variety of dryers may be used providing that adequate provisions are maintained to prevent escape of flammable ethyl chloride. A preferred form of dryer is a rotary continuous dryer. Heat is supplied by conventional means, vaporizing the ethyl chloride wetting the solids. Dried materials leaving are thus free of ethyl chloride as well as tetraethyllead, and are composed of lead, small amounts of unreacted sodium and sodium chloride produced in the reaction. These solids are discharged to a conveyor 57; the latter transporting the solids to smelting or furnacing operations wherein the metal values are separated from the salt content. The conveyor also acts as a seal for the nominal positive pressure on the dryer 55. The conveyor 57 is preferably a screw type conveyor and is operated completely filled with dried solids. A small flow of nitrogen is introduced through line 58 and prevents passage of ethyl chloride vapor through conveyor 57.

The liquid effluent from the settler 21 is discharged through line 30. This liquid is free of solids and contains substantially all the tetraethyllead produced in reactor 10. The effluent also contains the ethyl chloride which has been used for extracting tetraethyllead from the solids in the extracting zone 22, less the ethyl chloride vaporized. The liquid effluent is divided into two portions. One such portion is returned to reactor 10 through line 11 by the pump P; the other portion flows to a final purification section through line 31.

The subsequent purification steps consist of distillation separation of the ethyl chloride, aeration, and water washing. The liquid flows through line 31 to still 32. Heat is applied by a fluid in jacket 33, vaporizing most of the ethyl chloride diluting the tetraethyllead. The partially purified tetraethyllead flows through line 34 to a second still 35 where a further distillation is carried out. The ethyl chloride, and some tetraethyllead, are liquefied in condensers 36 and 37, the condensate being returned to the extractor 22 through line 38.

Crude tetraethyllead from still 35 goes to an oxidation scrubbing tower 41, where it is contacted by an oxidizing gas. This treatment oxidizes undesirable organometallic impurities in the crude tetraethyllead, and also vaporizes final traces of ethyl chloride or hydrocarbons in the liquid. The oxidizing gas is circulated by fan or pump 42. Make up air or other oxygen containing gas is introduced through line 43 into the line 45. Traces of ethyl chloride and tetraethyllead vaporized in the oxidizing gas are condensed in condenser 46. The condensate is separated in disengaging drum 47 and recycled through line 49 to the first still 32. Sufficient aeration gas is vented through line 48 to discharge the products of oxidation of impurities.

The aerated tetraethyllead flows through line 50 to final water wash in tower 51. Washed tetraethyllead is discharged to a settler 52. Any sludge formed as a result of the aeration and the water washing is discharged from the system through line 53 for separate recovery of tetraethyllead content. Occasionally some of this sludge is ditched through line 59. Purified tetraethyllead flows to storage or utilization through line 54.

An outstanding characteristic of the process is the flexibility of operation provided. Reactor 10 can be operated to yield an effluent stream containing from below 5 weight per cent to about 50 weight per cent tetraethyllead, a preferred concentration range being about 25 to 35 weight per cent. The process can be operated to give an overflow from the settler 21 containing from 10 to 40 weight per cent tetraethyllead, a preferred concentration being about 20 weight per cent. This flexibility permits operation at condiitons which are optimum at the time.

In starting up the process, it will be found desirable to preheat the liquid feed to the reactor by means of heat exchanger 60. Preheating the liquid is not required once the reaction is initiated.

It will be obvious to one skilled in the art that numerous variations can be made in the embodiment of Figure I without departing from the substance of the invention. For example, if desired, molten alloy can be introduced at the bottom of the reactor, or at an intermediate point. Feed of alloy in this manner eliminates the need of a baffle at the top of the reactor, but requires that the alloy be fed directly into a liquid.

Another variation in the utilization of the invention is different means of removing heat from the reactor. Instead of vaporizing substantial quantities of ethyl chloride, liquid from the reactor can be withdrawn and cooled in heat exchangers. This method, although requiring more equipment, prevents the evolution of copious quantities of vapor within the reactor which tends to increase its size requirements.

Figure II shows another specific embodiment of the invention for a further understanding of its flexibility and advantages. To avoid repetition, Figure II does not show the distillation and other incidental steps in the purification of the crude tetraethyllead, but this figure does show the novel steps of the embodiment.

Referring to Figure II, the reaction producing tetraethyllead is carried out in a reactor 70 of cylindrical cross section. An alloy of sodium and lead is introduced through line 71 to the top of the reactor.

The alloy is preferably introduced as a molten liquid, by means of a spray nozzle. The drops or spray particles solidify almost as soon as they are immersed in the liquid phase in the reactor. These relatively large particles sink through the reactor and accumulate at the bottom. After a short period of contact with the ethylating liquid, the particles disintegrate into smaller sizes as heretofore described. The ethylating agent is introduced through line 72 by means of pump P.

The accumulation of larger particles near the bottom of the reactor results in a higher liquid velocity at that region. As the smaller solids are formed, they are carried upwardly in the reactor. The overall effect of this reactor operation is to provide a classification of the solids in the reactor according to the extent of reaction. The concentration of solids decreases from bottom to the top of the reactor, and is accompanied by a decrease in liquid velocity.

Ethyl chloride vaporized during the reaction leaves through line 73 and is liquefied in condenser 74. Non-condensable hydrocarbons formed are separated from condensed ethyl chloride in separatory drum 75 and vented through line 76. Ethyl chloride is returned to the reactor through line 77. A baffle 78 separates the alloy feed side of the reactor from the point of withdrawal of the reactor effluent through line 79.

Reactor effluent flows to the separating unit 80. This apparatus is essentially a settling vessel for obtaining a solids free liquid stream. The primary separation is carried out in section 81. Section 82 consists of an inclined wall chamber wherein the solids accumulate at the bottom, forming a slurry with solids content of up to about 90 weight per cent total solids. Separating unit 80 operates at the same elevated pressure conditions as reactor 70. The heavy slurry of solids formed in the settler passes through valve 83 which substantially reduces the pressure on the stream.

Some of the ethyl chloride and tetraethyllead present are vaporized in settler 80 and are condensed and recycled, non-condensable hydrocarbons being vented through line 89.

The solids free liquid stream is discharged through line 90, and control valve 91. Part of this solid free liquid is diverted through line 92 and is recycled to the reactor.

The heavy slurry from the bottom of settler 82 flows to a pressurized rotary filter 94. The solids are picked up on the filter drum 95. A stream of fresh ethyl chloride is introduced through line 96 and sprayed on the filter drum surface, dissolving any tetraethyllead adhering to the solid particles. The filtrate leaves the filtering unit through line 97 and is returned to the reactor through line 72. Filtered and washed solids are removed from the drum surface by a scraping blade 98, and are fed to a conveyor 99. Line 100 admits a small flow of inert gas to conveyor 99, thus providing a positive pressure seal for the filter unit 94.

The conveyor 99 transports a mixture of solids to subsequent metal recovery operations. The solids, free of tetraethyllead, but wet with ethyl chloride, are dried and metal values recovered by furnace treatment as previously mentioned.

A portion of the solids free liquid from the settler flows to a purification section through line 93. This stream consists of tetraethyllead and ethyl chloride, plus minor amounts of impurities. The purification is carried out by methods such as described in connection with Figure I.

Our invention is not limited to the manufacture of tetraalkyllead compounds but is applicable to other alkyllead compounds such as dimethyldiethyllead, dimethyldiphenyllead and the like.

In addition to the foregoing embodiments given for an understanding of our invention, numerous other embodiments are possible within the scope of the following claims.

We claim:

1. The process of reacting an active form of lead with an alkylating agent, whereby an alkyllead and solid reaction products are formed, comprising continuously introducing the lead into an ascending stream of the alkylating agent, said alkylating agent being liquid at the reaction temperature and pressure used, suspending the lead in the stream by the initial velocity of the stream, classifying the reaction solids and the lead by maintaining a terminal velocity of not more than the initial velocity, and separating the alkyllead from the other reaction products.

2. The process of claim 1 in which the initial velocity is in excess of 0.10 feet per second.

3. The process of claim 1 in which the terminal velocity is in excess of 0.03 feet per second.

4. The process of claim 1 in which the initial velocity is greater than 0.10 feet per second and the terminal velocity is greater than 0.03 feet per second but less than the initial velocity.

5. The process of claim 1 in which the removed reaction products and alkylating agent are separated into liquids and solids and the alkyllead is then washed from the solids with a liquid solvent.

6. The process of claim 1 in which the separating step comprises separating the solids from the liquids by settling and then washing the alkyllead from the solids by flowing a solvent upwardly through the solids at a velocity of less than approximately 0.03 to 0.05 feet per second.

7. The process of reacting sodium-lead alloy with an excess of ethyl chloride whereby a mixture of tetraethyllead, solid reaction products, and unreacted ethyl chloride results, comprising contacting and reacting the sodium-lead alloy with an ascending stream of ethyl chloride at a temperature between about 70 and 120° C., for a time of between about .01 and 2 hours, said ethyl chloride being liquid at the reaction temperature and pressure used, maintaining the initial velocity in the lower portion of the ascending stream above 0.10 feet per second, maintaining the terminal velocity in the upper portion of the ascending stream between about 0.03 to 0.15 foot per second but not greater than the initial velocity, removing from the system a mixture of reaction products, and separating the tetraethyllead from the mixture.

8. The process of claim 7 in which the velocity of the ascending stream of ethyl chloride is decreased during its upward travel.

9. The process of reacting an active form of lead with an excess of ethylating agent, whereby tetraethyllead, solid reaction products, and unreacted ethylating agent results, comprising continuously introducing the lead into an ascending stream of the ethylating agent, said ethylating agent being liquid at the reaction temperature and pressure used, suspending the lead in the ethylating agent by the initial velocity of the ethylating agent, classifying the reaction solids and the lead by maintaining a terminal velocity of not more than the initial velocity, continuously removing from the system a mixture of said solid reaction products and tetraethyllead with the unreacted ethylating agent, and separating the tetraethyllead from the mixture.

10. The process of manufacturing an alkyllead comprising continuously introducing an alkylating agent into the lower end of a vertically elongated reaction vessel, said alkylating agent being liquid at the temperature and pressure used in the alkylation reaction, continuously introducing an active form of lead into the upper end of said vessel, suspending the introduced lead by the initial velocity of the ascending stream of liquid alkylating agent, maintaining the velocity of the ascending stream throughout the length of the vessel at a velocity not greater than the initial velocity, and continuously removing the reaction products including the solids suspended in the alkylating agent, from the upper end of said reaction vessel.

11. In a process for alkylating lead, the steps of flowing a stream of liquid alkylating agent in an upward direction with the lower portion of the stream moving at the rate of at least 0.1 feet per second and the upper portion of the stream moving at the rate of at least 0.03 feet per second but less than rate of movement of the lower portion of the stream, the stream having a throughput time of about 0.1 to about 2 hours and a temperature between 40 and 150° C., introducing an active form of lead in finely divided condition into said stream to cause the finely divided lead to become suspended in the stream and be agitated and alkylated with a resultant decrease in density and upward transport by the stream to the upper portion, withdrawing from the upper portion of the stream an effluent mixture of liquid alkylating agent, alkylated lead and said upwardly transported material, and separating the alkylated lead from the withdrawn mixture.

HOWARD M. RODEKOHR.
SIDNEY M. BLITZER.

REFERENCES CITED

The following references are of record in the file of this patent:

UNITED STATES PATENTS

| Number | Name | Date |
|---|---|---|
| 1,622,228 | Midgley | Mar. 22, 1927 |
| 1,705,723 | Daudt | Mar. 19, 1929 |